United States Patent Office 2,754,623
Patented July 17, 1956

2,754,623

EROSION-STABLE SOIL

David T. Mowry and Ross M. Hedrick, Dayton, Ohio, assignors to Monsanto Chemical Company, St. Louis, Mo., a corporation of Delaware No Drawing. Application August 31, 1951,
Serial No. 244,739

12 Claims. (Cl. 47—1)

This invention relates to a method of preventing natural erosion of earth surface by water and wind. More specifically, the invention relates to methods of stabilizing soil surface areas until grass, or other cover crop, is established. The invention also includes new stabilized soil surfaces of characteristic structure.

In a copending application, of which this is a continuation-in-part, Serial No. 197,825, filed November 27, 1950, by Ross M. Hedrick and David T. Mowry (now abandoned), there are described and claimed methods of improving soil structure by the dispersion in the surface layers of the soil a water-soluble polymer of an acrylic or methacrylic acid or derivatives thereof. These methods are useful in the minimization of erosion, and the new stabilized soil so produced is inherently resistant to the forces of wind and water which are usually responsible for destructive erosion.

It has now been found that the particular method of application of the same polymers to the soil is of critical importance in achieving the optimum effect. By applying the polymer to the surface of the soil as a powder or in other solid form, or as a solution a thin water-pervious film of polymer is formed, which enhances the soil stability by mechanically binding the soil particles on the surface into a cover structure. If the dry powder is applied the polymer becomes effective by the application of water or rainfall or by adsorption of soil water. In humid climates the polymer may pick up sufficient moisture by adsorption from the air to become effective for the purpose of this invention.

Once the polymer is applied the effect, according to present information, is permanent for at least one year and possibly longer. The effective life of the treatment depends, of course, upon the intensity of rainfall, the type of soil and the amount of additive used. After the polymer has been applied the surface should not be disturbed by any mechanical action tending to disrupt the surface and to expose the underlying soil layers.

The treatment is effective for preventing soil erosion prior to the establishment of a vegetative cover crop or in view of its substantial permanence it may be employed directly without such vegetative cover crop.

In accordance with this invention it has been found that soils to the surface of which water-soluble acrylic polymers are applied have unusual resistance to natural erosion. Suitable polymers are those containing numerous recurring molecular units indicated by the structural formula:

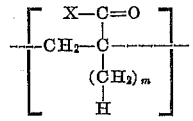

wherein X is a solubilizing radical of the group consisting of —OK, —ONa, —ONH$_4$, —ONRH$_3$, —ONR$_2$H$_2$, —ONR$_3$H, —ONR$_4$, —OH, —NH$_2$, —OCH$_2$NR$_2$, —OCH$_2$CH$_2$NR$_2$, —NHR and —NR$_2$, R is an alkyl radical having up to four carbon atoms, and $m$ is a small whole number from zero (0) to one (1), inclusive. Of particular value are the homopolymers containing numerous identical groups of the class described above. Also of value are the copolymers containing two or more kinds of the described groups. The copolymeric type may have in addition to the numerous water-soluble groups minor amounts of other groups derived from polymerizable monomers, such as styrene, vinyl acetate, acrylonitrile, methacrylonitrile, butadiene, the alkyl methacrylates, the alkyl acrylates, vinylidene chloride, vinyl chloride, the alkyl maleates, the alkyl fumarates, α-methylstyrene, and other olefinic compounds capable of polymerization with the various acrylates described above. In general the polymers must contain sufficient of the solubilizing groups to render them soluble in water and to impart a hydrophilic character to the soil particles.

The compounds useful in the practice of this invention may be regarded as water-soluble polymers of acrylic and methacrylic acid derivatives, including acrylic acid, methacrylic acid, acrylamide, methacrylamide, the alkali metal, amine, and ammonium salts of either acrylic or methacrylic acid, β-aminoethyl acrylate, β-aminoethyl methacrylate, β-methyl aminoethyl acrylate, β-methyl aminoethyl methacrylate, N,N-dimethyl-β-aminoethyl methacrylate, and the N-alkyl substituted acrylamides and methacrylamides.

The water-soluble acrylic polymers may contain substantial proportions of groups derived from other polymerizable monomers, as above described.

The water-soluble acrylic polymers may be applied to the surface of the soil in widely varying concentrations; as little as 0.1 pound per hundred square feet and as high as five pounds per hundred square feet will give satisfactory results. Optimum usage utilizes from 0.2 to 1.0 pound per hundred square feet.

For optimum beneficial effect the molecular weight of the polymer is of some importance. It appears that molecular weights in excess of 10,000 are desirable and the optimum practice requires molecular weights approximately 15,000. With some polymers the effect reaches a maximum at 30,000 to 100,000, and further increases in molecular weights may not improve the polymer, although no serious reduction is experienced. Cross-linked polymers are operative, but linear polymers are preferred.

The method of this application, wherein the finely divided polymer is spread on the soil surface is especially useful where a vegetative cover crop is to be grown. In the period prior to the emergence of the seedling the enhanced stability due to the surface polymer film gives additional protection. The growth of a vegetative cover crop will be favorably promoted and the combination of the polymer stabilized surface with the cover crop will provide additional stability to the soil. Moreover, the surface film does not prevent or retard the emergence of the seedling, but it does provide maximum stability during the vulnerable period prior to the development of the cover crop.

As a result of the present invention the soil will have improved porosity, freedom of water-logging, better aeration, longer water-retention during dry periods, reduced surface evaporation, better fertilizer utilization and better crop yield.

In the practice of the particular method the dry polymer is spread on the soil surface by using any conventional spreading device, for example, fertilizer applicators, or any device adapted to make light uniform depositions on soil surfaces. Generally, the polymer should be watered slightly, but in humid areas the water which the hygroscopic polymer will absorb from the atmosphere will often be sufficient. In all cases some water is desirable to convert the light polymer to a heavy more adhesive form to prevent its removal by wind action. The polymer may be mixed with the seed and applied simultaneously, or it may be separately added before or after the seed is sown. The dragging of the seeded area and/or rolling of the surface may take place after or before the polymer is applied. Generally, the optimum effect is achieved by applying the polymer after the seed bed is prepared and without any subsequent mechanical action which may at least in part cause a dispersion of the poylmer or disrupt the continuous film on the soil surface.

Examples of the water-soluble polymers useful in the practice of this invention and methods for their preparation are as follows:

*Polyacrylamide.*—Ten grams of acrylamide and 0.05 gram of potassium persulfate were dissolved in 90 ml. of water and heated in an oven at 60° C. for five hours. Because of some hydrolysis the polymer contained some ammonium salt and imide groups in addition to acrylamide units. The solution was diluted with 400 ml. of water for use in further tests.

*Dimethylaminoethyl polymethacrylate.*—Ten grams of dimethylaminoethyl methacrylate, and 3.86 grams of glacial acetic acid and 0.2 gram of potassium persulfate were dissolved in 90 ml. of water. This was placed in an oven at 70° C. overnight before dilution with 400 ml. of water.

*Sodium polyacrylate–vinyl alcohol copolymer.*—Ten grams of a finely ground copolymer of acrylonitrile (95%) and vinyl acetate (5%) having a specific viscosity of 0.28 (0.1% solution in dimethylformamide) was suspended in a solution of 0.1 gram of stearic acid and seven grams of sodium hydroxide in 400 ml. of water. The suspension was stirred and refluxed for ten hours during which time the polymer dissolved because of the hydrolysis of nitrile to amide and carboxylic acid sodium salt groups. The resultant solution was adjusted to a pH of eight by the addition of a small amount of hydrochloric acid and the solution diluted with water to 500 ml. total volume.

*Acrylamide–acrylonitrile copolymer.*—Ninety grams of acrylamide, ten grams of acrylonitrile, 0.2 gram of potassium persulfate and 0.1 gram of sodium bisulfite were dissolved in one liter of 50 per cent methyl alcohol and heated for four days at 60° C. The resultant precipitated polymer was then filtered, washed with methanol and dried. Two grams of this material was dissolved in 98 ml. of water for evaluation.

*Sodium polymethacrylate.*—Fifty grams of polymethacrylic acid having a specific viscosity of 1.25 (0.4% solution in dimethylformamide) and 17.5 grams of sodium hydroxide were dissolved in a liter of water.

*Ammonium polymethacrylate.*—Two grams of the polymethacrylic acid described above was dissolved in a mixture of 96 ml. of water and two ml. of concentrated ammonium hydroxide.

*Ammonium polyacrylate.*—Two grams of polyacrylic acid having a specific viscosity of 8.3 (0.4% solution in water) was dissolved in 98 ml. of water containing 2.8 ml. of concentrated aqueous ammonia.

*Sodium polyacrylate.*—Twenty grams of the above polyacrylic acid was dissolved in 980 ml. of water containing eleven grams of sodium hydroxide.

*Methacrylic acid (35%)–dimethylaminoethyl methacrylate (65%)-copolymers.*—Six and one-half grams of dimethylaminoethyl methacrylate and 3.5 grams of methacrylic acid were dissolved in 90 ml. of water and 0.02 gram of potassium persulfate was added as a catalyst. The solution was heated to 60° C. overnight and then diluted to a two per cent solution for use.

*Acrylamide (50%)–ammonium polyacrylate (50%).*—Two grams of a copolymer of acrylamide (50%)–acrylic acid (50%), having a specific viscosity (0.4% in water) of 0.46 was dissolved in 98 ml. of water containing 0.9 ml. of concentrated ammonia.

*Acrylamide (50%)–a m m o n i u m polymethacrylate (50%).*—Two grams of copolymer of acrylamide (50%)–methacrylic acid (50%), having a specific viscosity (0.4% in water at pH 5.66) of 2.3, was dissolved in 98 ml. of water containing one ml. of concentrated ammonia.

*Acid hydrolysis of methacrylic acid (50%)–acrylonitrile (50%) coplymers.*—Two grams of a copolymer of methacrylic acid (50%) and acrylonitrile (50%) was added to a solution of 15 ml. of water and 50 ml. of concentrated sulfuric acid. After several days the thick solution was diluted with water and heated to separate a polyacid which still contained 44 per cent of the original nitrogen. Two grams of dried polymer was dissolved in 100 ml. of solution containing one ml. of 28 per cent ammonia solution.

The acid hydrolysis method was applied to the following polymers: acrylonitrile (95%)–vinyl acetate (5%), acrylonitrile (98%)–vinyl acetate (2%), acrylonitrile (80%)–methacrylonitrile (20%), acrylonitrile (84%)–methacrylonitrile (11%)–vinyl acetate (5%), acrylonitrile (70%)–methacrylic acid (30%), and polyacrylonitrile.

Further details of the practice and beneficial results of the invention are set forth with respect to the following example:

*Example*

An artificially prepared surface of a silt loam soil was established with a 34° slope. The area was provided with a uniform sprinkling system to supplement normal rainfall. Test areas were laid out with perpendicular partitions to insure uniform watering of each bed. A drainage system with filters was provided to collect all soil washed from each area. The areas were all worked uniformly and seeded with regular commercial lawn seed mixture. Some areas were mixed with the sodium salt of hydrolyzed polyacrylonitrile which was substantially sodium polyacrylate, and in other areas the polymer was added to the surface after preparation of the seed bed. Still other areas were treated similarly except that no polymer was included or added. The following table demonstrates the beneficial effect of the use of the polymers in erosion control and the particular benefits of the surface application method.

| Agent | Quantity, lbs/per 100 ft.² | Polymer Treatment | Soil, Lost Tons Per Acre | |
|---|---|---|---|---|
| | | | After 3.8 inches rainfall | After 2.9 in. additional rainfall |
| Sodium salt of hydrolyzed polyacrylonitrile. | 2.0 | Raked in | 4.7 | 3.69 |
| Do | 0.5 | Surface | 0.69 | 0.47 |
| Do | 1.0 | Raked in | 6.74 | 4.43 |
| None | 0.0 | None | 21.2 | 11.4 |
| Do | 0.0 | do | 19.8 | 17.2 |

This invention is defined by the following claims.

What we claim is:

1. An erosion-stable soil which comprises a natural soil containing on the surface thereof a substantially continuous film of a water-soluble polymer of a compound of the class consisting of acrylic acid, methacrylic acid, acrylamide, methacrylamide, the alkali metal, amine and ammonium salts of acrylic and methacrylic acids, the alkylaminoethyl acrylates, the alkylaminoethyl methacrylates and the alkyl substituted ammonium salts of acrylic and methacrylic acids, said alkyl radicals having up to four carbon atoms, said polymer being substantially free of cross-linking.

2. The product defined by claim 1 wherein the polymer is polyacrylamide.

3. The product defined by claim 1 wherein the polymer is polymethacrylamide.

4. The product defined by claim 1 wherein the polymer is made by the hydrolysis of a polymer of at least 70 per cent acrylonitrile and up to 30 per cent of another polymerizable mono-olefinic monomer.

5. The product defined by claim 1 wherein the polymer is a salt of polyacrylic acid.

6. The product defined by claim 1 wherein the polymer is a salt of polymethacrylic acid.

7. An erosion-stable soil which comprises a natural soil containing on the surface thereof a substantially continuous film of a water-soluble polymer of a compound having the radical:

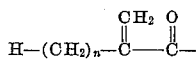

wherein $n$ is a small whole number from zero (0) to one (1), inclusive, said polymer having a molecular weight of at least 10,000 and a structure derived by olefinic polymerization.

8. The product defined by claim 7 wherein the polymer is polyacrylamide.

9. The product defined by claim 7 wherein the polymer is polymethacrylamide.

10. The product defined by claim 7 wherein the polymer is made by the hydrolysis of a polymer of at least 70 per cent acrylonitrile and up to 30 per cent of another polymerizable mono-olefinic monomer.

11. The product defined by claim 7 wherein the polymer is a salt of polyacrylic acid.

12. The product defined by claim 7 wherein the polymer is a salt of polymethacrylic acid.

References Cited in the file of this patent

UNITED STATES PATENTS

| | | |
|---|---|---|
| 1,882,377 | Whittelsey | Oct. 11, 1932 |
| 1,976,679 | Fikentscher | Oct. 9, 1934 |
| 2,203,274 | Anderson | June 4, 1940 |
| 2,552,775 | Fischer et al. | May 15, 1951 |
| 2,582,194 | Dudley | Jan. 8, 1952 |
| 2,625,529 | Hedrick et al. | Jan. 13, 1953 |

OTHER REFERENCES

"The New Garden Encyclopedia," pub. 1941 by Wm. H. Wise & Co., N. Y., page 1233, article on top-dressing.

"Colloid Chemistry" (Alexander), pub. 1946 by Reinhold (N. Y.), vol. VI, page 490.

"Encyclopedia of Gardening" (Taylor), pub. 1948 by Houghton Mifflin Co., Boston; page 1120, article on top-dress.